(12) United States Patent
Paul et al.

(10) Patent No.: US 7,798,027 B2
(45) Date of Patent: Sep. 21, 2010

(54) POWER TAKEOFF AND GEARBOX

(75) Inventors: DuWayne E. Paul, Alexandria, MN (US); DuWayne R. Cookman, Elbow Lake, MN (US); Shawn M. Green, Alexandria, MN (US); Chad M. Orthaus, Alexandria, MN (US); Patrick W. Kruper, Alexandria, MN (US)

(73) Assignee: Illinois Tool Works Inc., Glenview, IL (US)

( * ) Notice: Subject to any disclaimer, the term of this patent is extended or adjusted under 35 U.S.C. 154(b) by 443 days.

(21) Appl. No.: 11/736,573

(22) Filed: Apr. 17, 2007

(65) Prior Publication Data

US 2008/0261745 A1    Oct. 23, 2008

(51) Int. Cl.
   *F16H 37/00* (2006.01)
(52) U.S. Cl. .................... 74/15.86; 475/343
(58) Field of Classification Search ............ 475/343, 475/269, 302, 295, 332; 192/85.24
   See application file for complete search history.

(56) References Cited

U.S. PATENT DOCUMENTS

| | | | | |
|---|---|---|---|---|
| 4,597,301 A * | 7/1986 | Weis et al. | ........... | 74/15.86 |
| 4,604,908 A * | 8/1986 | Dolan | ........... | 74/15.88 |
| 5,090,658 A * | 2/1992 | Kusmer | ........... | 251/14 |
| 5,330,103 A * | 7/1994 | Eckstein | ........... | 239/242 |
| 5,885,182 A * | 3/1999 | Forsyth | ........... | 475/198 |
| 5,947,860 A * | 9/1999 | Lagein | ........... | 475/331 |
| 5,961,828 A * | 10/1999 | McEwen | ........... | 210/526 |
| 6,425,839 B1 * | 7/2002 | Koelle et al. | ........... | 475/149 |
| 6,648,785 B2 * | 11/2003 | Porter | ........... | 475/5 |
| 2003/0145666 A1 | 8/2003 | Warner | | |

FOREIGN PATENT DOCUMENTS

| | | |
|---|---|---|
| DE | 3810911 | 10/1988 |
| EP | 1103407 | 5/2001 |
| GB | 2317937 | 4/1998 |
| JP | 2004122979 | 4/2004 |

OTHER PUBLICATIONS

International Search Report dated Jul. 18, 2008 for PCT/US2008/057307 filed Mar. 18, 2008.

* cited by examiner

*Primary Examiner*—David D Le
*Assistant Examiner*—Justin Holmes
(74) *Attorney, Agent, or Firm*—Levenfeld Pearlstein, LLC

(57) ABSTRACT

A power takeoff and gearbox is configured for use with an associated vehicle transmission to provide rotational power to an associated auxiliary component. The power takeoff and gearbox includes a housing. An input gear set includes an input gear and a transfer gear mounted for common rotation. The input gear is driven by the associated vehicle transmission. A primary drive gear is disposed on a drive shaft. The primary drive gear is meshed with the transfer gear for rotation with the transfer gear. A planetary gear system includes a carrier, a plurality of planet gears mounted for rotation within the carrier and a sun gear disposed central to the planet gears. The carrier is connected to the primary drive shaft for rotation with the shaft and for rotation of the planet gears relative to the carrier. An output is mounted to the sun gear for providing rotational power to the associated auxiliary component. The input gear set and the output are disposed, at least in part, within the housing and the primary drive gear and the planetary gear system are disposed within the housing. A clutch can also be included mounted within the housing.

12 Claims, 3 Drawing Sheets

POWER TAKEOFF AND GEARBOX

BACKGROUND OF THE INVENTION

The present invention relates to a power takeoff device for a transmission. More particularly, the present invention relates to a combination power takeoff and gearbox for a transmission for driving auxiliary equipment from the transmission.

Vehicles, such as cars, trucks, SUVs, military vehicles and the like often require auxiliary equipment to be driven to, for example, power a generator, drive a pump (such as a hydraulic pump) or the like. This permits the auxiliary equipment to be used in remote locations without the need for additional or separate drive units or engines.

Known arrangements for providing this auxiliary drive require a combination of a separate power take off and gearbox. The power take off is a unit that is directly driven from the vehicle transmission. The gearbox takes output from the power take off and changes the output speed of the driver unit, for example, an output shaft, to a desired drive speed. In addition, in order to engage and disengage the output shaft from the transmission, a clutch or other device must also be introduced into the system to effect this functionality.

The major drawback to providing an auxiliary power output is the space that is required to accommodate the equipment. A power takeoff that is separate from a gearbox which may be separate from a clutch can subsume valuable space that is need for other components. In fact, the space that is required can result in needed space taken away from other components. In addition to the space needed for these separate components, the added weight of two to three components is also a disadvantage to this arrangement.

Moreover, the known arrangements do not provide for easy selection of gear ratios and output speed (RPM).

Accordingly, there is a need for a combination power takeoff/gearbox that is a single, unitary device. Desirably, such a device is compact and is readily installed and removed from the vehicle. More desirably, such a device can be readily adapted to achieve a desired output speed and/or gear ratio. Most desirably, such a device is engaged and disengaged by an integral clutch assembly. Also most desirably, such a device is configurable for mounting of auxiliary equipment, eliminating the need for additional drive components such as couplings and drive shafts.

BRIEF SUMMARY OF THE INVENTION

A power takeoff and gearbox is configured for use with an associated vehicle transmission to provide rotational power to an associated auxiliary component, such as an electrical generator, a pump or the like. The power takeoff and gearbox includes a housing, an input gear set including an input gear and a transfer gear mounted for common rotation. The input gear is driven by the vehicle transmission.

A primary drive gear is disposed on a drive shaft and is meshed with the transfer gear for rotation with the transfer gear. A planetary gear system includes a carrier, a plurality of planet gears mounted for rotation within the carrier and a sun gear disposed central to the planet gears. The carrier is connected to the primary drive shaft for rotation with the shaft and for rotation of the planet gears relative to the carrier. An output is mounted to the sun gear for providing rotational power to the associated auxiliary component, The input gear set and the output are disposed, at least in part, within the housing and the primary drive gear and the planetary gear system are disposed within the housing.

The present combination power takeoff gearbox is a single, unitary device that is compact and readily installed and removed from the vehicle. The device can be readily adapted to achieve a desired output speed and/or gear ratio.

In a present embodiment, the power takeoff gearbox is engaged and disengaged by a clutch assembly. The clutch is also located within the housing.

The output can be configured as an output shaft that is readily mountable to the auxiliary equipment. Gear ratios of the input gear to the output can be in a range of 100:1 to 1:100. In a present device, the gear ratio is about 1:5.

The clutch can be mounted to the drive shaft. The clutch can be a wet clutch and can include a driven hub having internal splines that mate with splines on the drive shaft to transfer power to the drive shaft. In a present arrangement, the clutch includes a driven hub that is longitudinally movable to engage and disengage the clutch. In such an arrangement, a needle bearing can be disposed on the drive shaft, between the drive shaft and the clutch.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

While the present invention is susceptible of embodiment in various forms, there is shown in the figures and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 1:
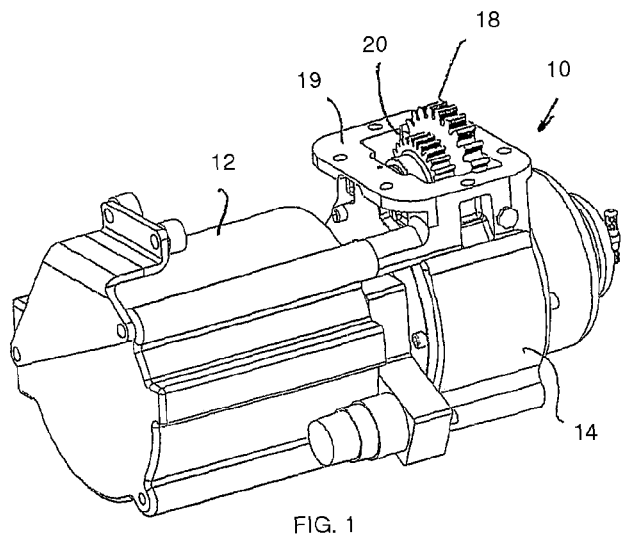
FIG. 1 is a perspective view of a power takeoff and gearbox, with an integral clutch, mounted to an exemplary electrical generator, the power takeoff and gearbox embodying the principles of the present invention.
Figure 2:
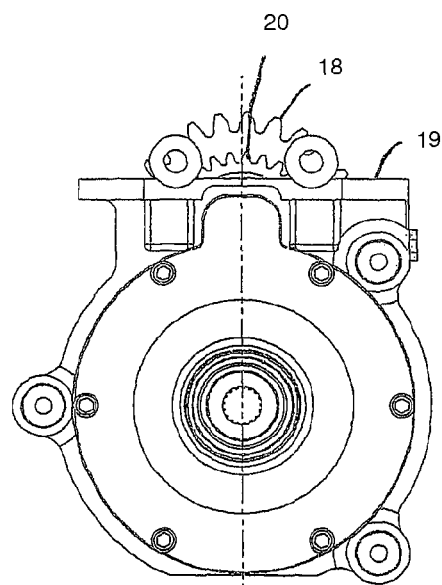
FIG. 2 is a front view of the power takeoff and gearbox.
Figure 3:
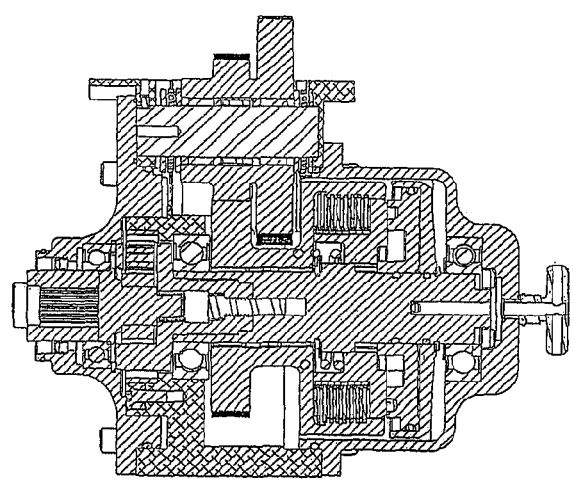
FIG. 3 is a cross-sectional view taken along line 3-3 of FIG. 2.

Referring now to the figures and in particular to FIG. 1 there is shown a perspective view of a power takeoff and gearbox (PTOG) assembly 10 with clutch embodying the principles of the present invention. The illustrated PTOG assembly 10 is shown with an electrical generator 12 mounted thereto to provide auxiliary electrical power that is powered or driven from, for example, a vehicle engine, through the vehicle transmission (not shown).

Figure 5:
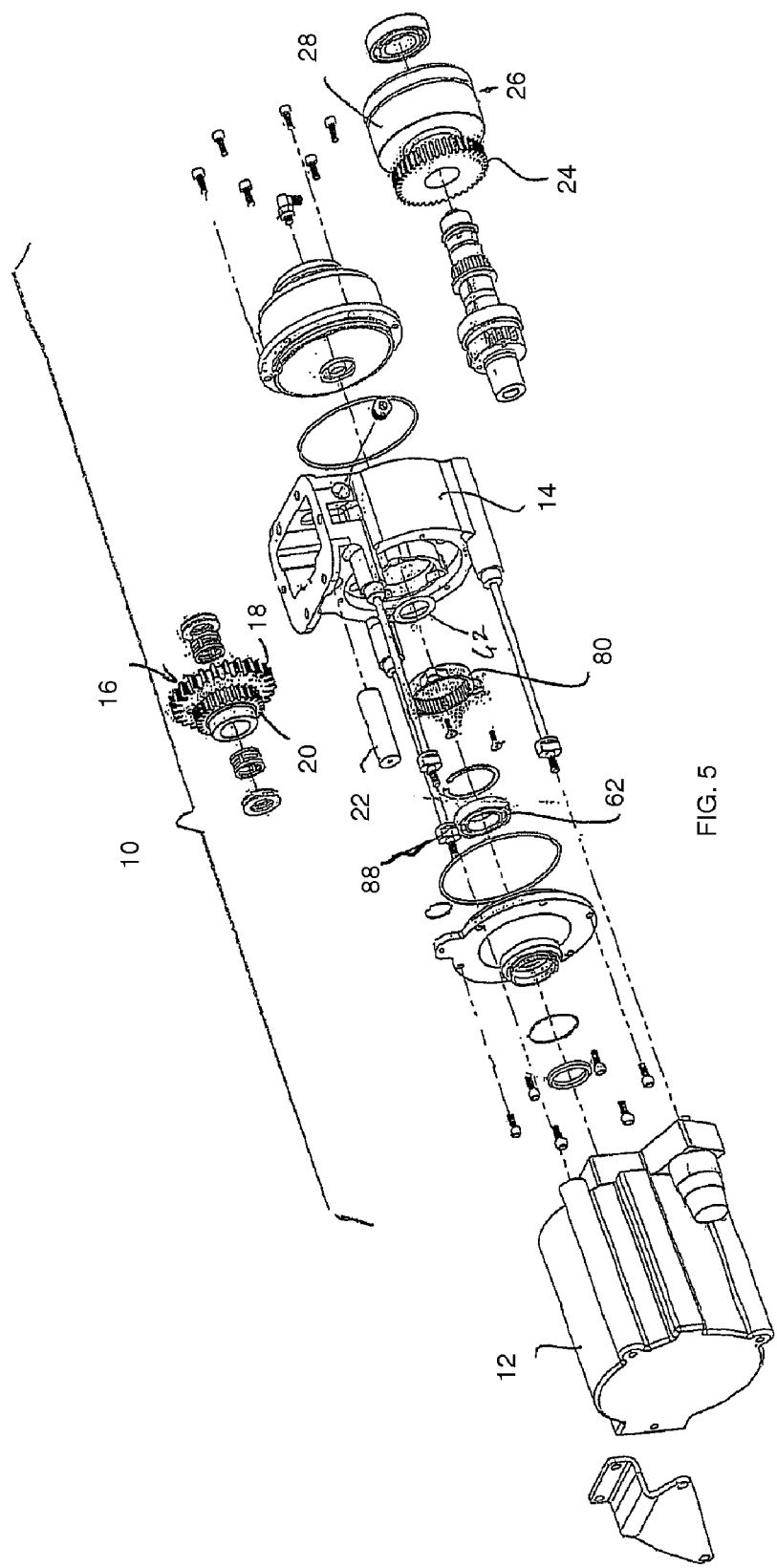
FIG. 5 is an exploded view of the power takeoff and gearbox.
Figure 4:
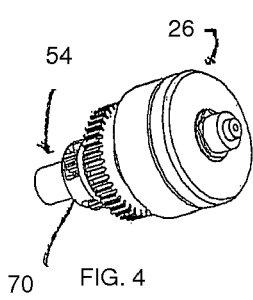
FIG. 4 is a perspective view of the clutch and drive shaft sub-assembly.

Referring now to FIG. 5, the PTOG assembly 10 is shown in an exploded view for ease of description. The assembly 10 includes a housing 14, an input gear set 16 having a drive gear 18 (for engagement with the transmission) and a transfer gear 20. The drive and transfer gears 18, 20 are fixed relative to one another such that rotation of the drive gear 18 results in rotation of the transfer gear 20. The drive and transfer gears 18, 20 are mounted on a common shaft 22 for rotation. The shaft 22 is mounted within the housing 14. Accordingly, and as seen in FIG. 1, at least a portion of the drive and transfer gears 18, 20 are positioned within the housing 14 and extend out beyond the transmission mount 19, only so far as to engage the transmission (not shown).

Figure 6A:
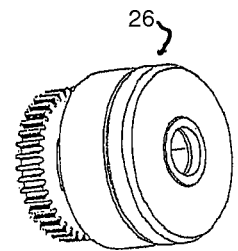
FIGS. 6A and 6B are assembled (perspective) and exploded views, respectively, of the clutch.
Figure 6B:
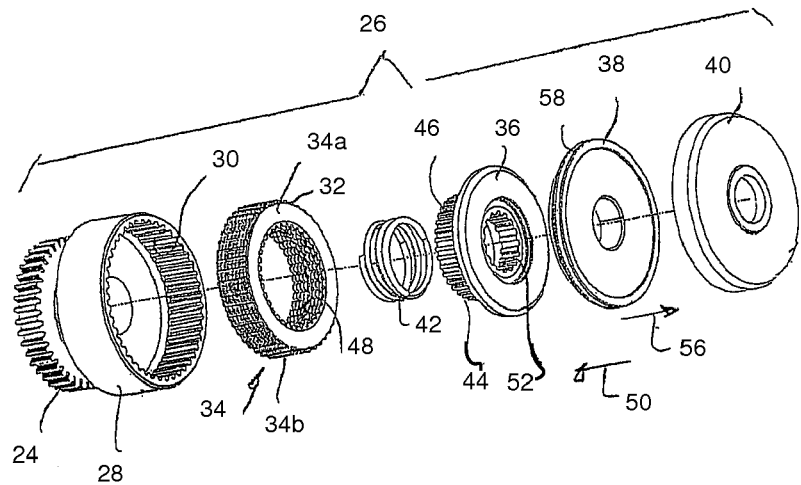
Figure 7A:
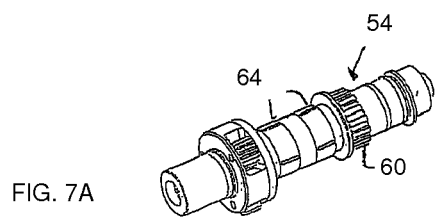
FIGS. 7A and 7B assembled (perspective) and exploded views, respectively, of the drive shaft, planetary gear system and output.
Figure 7B:
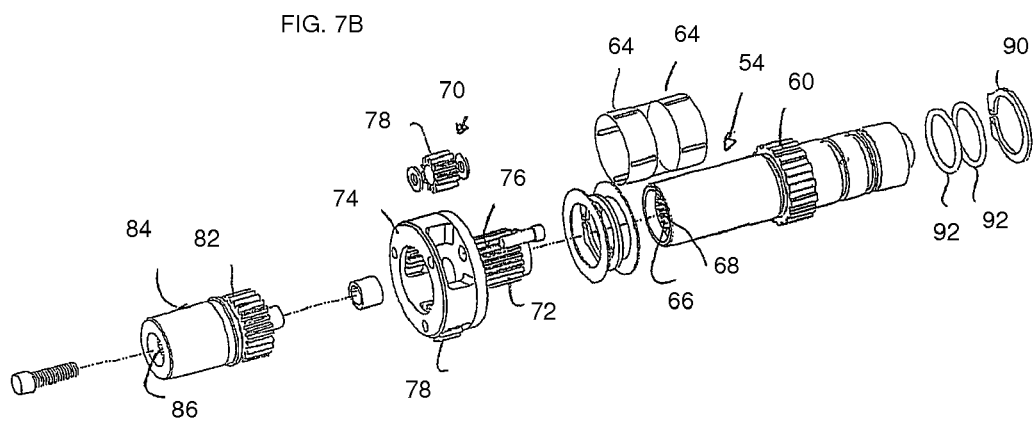

The transfer gear 20 is meshed with a primary gear 24 in the PTOG 10. The primary gear 24 is mounted to a wet clutch 26 that includes a clutch drive housing 28 that houses the internal components of the clutch 26. Referring briefly to FIGS. 6A and 6B, the clutch drive housing 28 includes internal splines 30 that mesh with teeth 32 formed on the outer periphery of alternate ones of the clutch plates 34a in the pack 34. The clutch 26 further includes a driven hub 36 and piston 38, and a cap 40. A spring 42 serves to force the piston 38 outwardly. The driven hub 36 includes a sleeve 44 that projects inwardly that has splines 46 formed on the outer surface. The splines 46 mesh with teeth 48 formed on an inner periphery of the others of the clutch plates 34b in the pack 34. By moving the piston 38 inwardly, (in the direction indicated by the arrow at 50), the piston 38 engages the driven hub 36 to move the hub 36 and compress the clutch pack 34. This, in turn, engages the driven hub 36 with the clutch pack 34. The driven hub 36 further includes an internal spline formation 52 to, as will be discussed below, engage the primary drive shaft 54.

When the clutch 26 is disengaged, the piston 38 is urged outwardly (as indicated by the arrow at 56), by the spring 42, which allows the clutch pack 34 to expand and the driven hub 36 to disengage from the clutch pack 34. In this state, the primary gear 24 is rotating but the driven hub 36 is stationary (not driven). The piston 38 is moved by application of a pressurized fluid, such as oil, against the piston 38. Seals 58 are appropriately positioned at the fluid/non-fluid barriers to maintain the piston within the pressurized fluid environment.

The primary drive shaft 54 is mounted for rotation with the driven hub 36. The shaft 54 includes multiple splines 60 longitudinally along an outer surface that engage the driven hub inner splines 52 to transfer power from the primary gear 24 to the primary drive shaft 54 when the clutch 26 is engaged. One or more bearings 62 are positioned along the shaft 54 to assure proper rotation and position of the shaft 54. In addition, when the primary gear 24 and clutch drive housing 28 are rotating but the clutch 26 is disengaged, to prevent damage to the drive shaft 54, needle bearings 64 are positioned on the shaft 54 on which the gear 24 and housing ride 28.

An internal surface 66 of the shaft 54 includes splines 68. A planetary gear set 70 is mounted to the shaft 54. The planetary gear set 70 includes a stub 72 mounted to a planet gear carrier 74. The stub 72 has outer splines 76 and fits into the shaft 54 to mate the splines 68 and 76. A present planetary gear set 70 uses concurve spur gears, commercially available from ITW Spiroid of Alexandria, Minn. Likewise, the other gears used in the present power takeoff gearbox 10 are commercially available from ITW Spiroid.

The carrier 74 includes three gears 78. The carrier 74 is positioned in a ring gear 80 that is mounted to the housing 14 to maintain the planetary gear set 70 in place. A sun gear 82 is meshed with the planet gears 78. The sun gear 82 is mounted to an output shaft 84. The output shaft 84 includes internal splines 86 and is configured to mount to the auxiliary, driven equipment (such as the illustrated generator 12, a pump, or the like). Various bearings 88, snap rings 90 and seals 92 are disposed within the power takeoff gearbox 10.

In operation, the clutch 26 is engaged by actuation of a solenoid valve (not shown) which in turn routes fluid (oil) to the clutch piston 38. The oil moves the piston 38, as indicated by the arrow at 50, which in turn moves the driven hub 36 into engagement with and compresses the clutch plate pack 34. Compressing the clutch plate pack 34 engages the driven hub 36 and the clutch plate housing 28 (and primary gear 24) with the clutch plates 34a,b to provide power to the driven hub 36.

With the driven hub 36 now rotating, the driven hub 36 also engages and rotates the primary drive shaft 54. As the drive shaft 54 rotates, it in turn rotates the planetary gears 78 which rotate the sun gear 82 mounted to the output shaft 84.

When the clutch 26 is disengaged (oil pressure is removed from the piston 28), the clutch pack 34 is allowed to relax (by action of the spring 42). This in turn disengages the driven hub 36 from the pack 34 and the clutch drive housing 28, which, in turn isolates power from the drive shaft 54. Even though the driven hub 36 is disengaged from the drive shaft 54, the clutch drive housing 28 (and primary gear 24) continue to rotate. The clutch drive housing 28 and gear 24 ride on the needle bearings 64 which provide a bearing surface and prevent damage to the shaft 54.

The present PTOG 10 includes a planet gear set 70 in which the gear ratio of the sun gear 82 (that thus the output shaft 84) to the drive shaft is 3:1. It is anticipated that a wide range, for example, a range of 100:1 to 1:100 can be configured for the present power takeoff gearbox assembly 10.

It will be appreciated that the present power takeoff and gearbox with integral clutch 10 require considerably less space than present known systems that include multiple components. In addition, because the present PTOG 10 is a unitary device, it also adds less weight to the vehicle overall. Moreover, because of the integrated design, the present PTOG device 10 can be configured for adapted to a wide range of vehicle transmissions and accessory or auxiliary components currently available and in the future.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the claims.

What is claimed is:

1. A unitary, removable power takeoff and gearbox for use with an associated vehicle transmission having a housing, for providing rotational power to an associated auxiliary component, comprising:
   a housing,
   an input gear set including an input gear and a transfer gear, mounted for common rotation, the input gear driven by the associated vehicle transmission;

a primary drive gear disposed on a drive shaft, the primary drive gear meshed with the transfer gear for rotation therewith, a planetary gear system including a carrier, a plurality of planet gears mounted for rotation within the carrier and a sun gear disposed central to the planet gears, the carrier being connected to the primary drive shaft for rotation with the shaft and for rotation of the planet gears relative to the carrier; and an output mounted to the sun gear for providing rotational power to the associated auxiliary component, wherein the input gear set and the output are disposed, at least in part, within the housing and wherein the primary drive gear and the planetary gear system are disposed within the housing, wherein a clutch is directly mounted to the drive shaft, the drive shaft disposed on a driven hub within the clutch, the driven hub being directly actuated longitudinally to engage and disengage the clutch by a clutch piston.

2. The power takeoff and gearbox in accordance with claim 1 wherein the output is an output shaft.

3. The power takeoff and gearbox in accordance with claim 1 wherein a gear ratio of the input gear to the output is in a range of 100:1 to 1:100.

4. The power takeoff and gearbox in accordance with claim 3 wherein the gear ratio is about 1:5.

5. The power takeoff and gearbox in accordance with claim 1 wherein the clutch engages and disengages the output and the input gear set.

6. The power takeoff and gearbox in accordance with claim 1 wherein the clutch includes a driven hub having internal splines and the drive shaft has splines for engaging the driven hub splines.

7. A unitary, removable power takeoff and gearbox for use with an associated vehicle transmission, for providing rotational power to an associated auxiliary component, comprising:

a housing;

an input gear set including an input gear and a transfer gear mounted for common rotation, the input gear driven by the associated vehicle transmission;

a clutch having a primary drive gear disposed on a drive shaft, the primary drive gear meshed with the transfer gear for rotation therewith, the clutch being engaged to rotate the drive shaft with the primary drive gear and disengaged to permit free rotation of the primary drive gear without rotation of the drive shaft;

a planetary gear system including a carrier, a plurality of planet gears mounted for rotation within the carrier and a sun gear disposed central to the planet gears, the carrier being connected to the primary drive shaft for rotation with the shaft and for rotation of the planet gears relative to the carrier; and an output mounted to the sun gear for providing rotational power to the associated auxiliary component, wherein the input gear set and the output are disposed, at least in part within the housing, and wherein the primary drive gear, the planetary gear system and the clutch are disposed within the housing and are together removable and separable from the associated vehicle transmission in one unit, wherein the clutch is directly mounted to the drive shaft, the drive shaft disposed on a driven hub within the clutch, the driven hub being directly actuated longitudinally to engage and disengage the clutch by a clutch piston.

8. The power takeoff and gearbox in accordance with claim 7 wherein the output is an output shaft.

9. The power takeoff and gearbox in accordance with claim 7 wherein a gear ratio of the input gear to the output is in a range of 100:1 to 1:100.

10. The power takeoff and gearbox in accordance with claim 9 wherein the gear ratio is about 1:5.

11. The power takeoff and gearbox in accordance with claim 7 wherein a first spline set is on an exterior surface of the drive shaft and a second spline set is on an interior surface of the driven hub.

12. The power takeoff and gearbox in accordance with claim 7 including a needle bearing disposed on the drive shaft, between the drive shaft and the clutch.

* * * * *